350-169. SR 6-4-74 XR 3,814,853

United States Patent [19]

Lardeau

[11] 3,814,853

[45] June 4, 1974

[54] VARIABLE-FIELD MIXER FOR TELEVISION TRANSMISSIONS

[75] Inventor: Jacques Lardeau, Rosny-sous-Bois, France

[73] Assignee: Societe d'Optique, Precision Electronique et Mecanique-SOPELEM, Paris, France

[22] Filed: Nov. 14, 1972

[21] Appl. No.: 306,297

Related U.S. Application Data

[63] Continuation of Ser. No. 100,692, Dec. 22, 1970, abandoned.

[30] Foreign Application Priority Data

Dec. 31, 1969 France ........................ 69.45627
June 12, 1970 France ........................ 70.21585

[52] U.S. Cl. .............. 178/7.85, 178/7.88, 178/7.92, 178/DIG. 23, 178/DIG. 30, 178/DIG. 6, 350/43, 350/169

[51] Int. Cl. ........................................... H01j 29/89

[58] Field of Search ........... 350/169, 171, 173, 174, 350/43; 178/7.85, 7.88, 7.92, DIG. 23, DIG. 30, DIG. 6

[56] References Cited

UNITED STATES PATENTS 2,821,105 1/1958 Walker .............................. 350/174
2,854,901 10/1958 Fathauer .............................. 350/174
3,337,685 8/1967 Bougle .............................. 178/7.88
3,575,552 4/1971 Grant et al..................... 178/DIG. 6

FOREIGN PATENTS OR APPLICATIONS 1,193,791 6/1970 Great Britain ...................... 350/169
258,890 5/1963 Australia ............................ 350/169

*Primary Examiner*—Robert L. Griffin
*Assistant Examiner*—Edward L. Coles
*Attorney, Agent, or Firm*—Cameron, Kerkam, Sutton, Stowell & Stowell

[57] ABSTRACT

A variable feed mixer which includes two semi-reflective blocks for location in front of a television camera lens focussed for infinity and defining three injection apertures for receiving images from three sources, a variable focal length lens of the zoom type generally comprising a primary lens associated with the varying element, the primary lens having been removed being positioned in front of one of the injection apertures.

2 Claims, 5 Drawing Figures

VARIABLE-FIELD MIXER FOR TELEVISION TRANSMISSIONS

This is a continuation, of application, Ser. No. 100,692, filed Dec. 22, 1970 now abandoned.

The invention relates to a variable-field mixer for television transmissions, and the use of such a mixer to form composing stations for visual or audio-visual broadcasts, for transmission immediately or later.

In many television applications it is desirable to be able to transmit, separately or simultaneously, a cine image, a photographic image or possibly the image of an actual object.

For this purpose a mixer known as a "triplex" was developed, which is placed in front of a television camera lens focussed for infinity. This mixer is formed of two semi-reflective blocks and has three orifices for the injection of images. If, for example, a cine projector and a slide projector are placed in front of two of the three image injection orifices, and if the lenses of these projectors are focussed for infinity, the film or slides can be seen on the tube and therefore on the television receiver. The result is therefore a film television or television projector which can transmit either image if only one projector is lit, or mix both images if both projectors are lit simultaneously. Also, since there is no movement, there can be no faults of centering.

Also, a supplementary lens of focal length 1 m, for example, has been placed in front of the third image injection orifice, to permit focussing on an object 1 m away. It is therefore possible to transmit the image of an actual object, but the size of the object seen is determined by the focal length of the camera lens.

If the camera lens has a focal length of 100 mm, so that it can be adapted to conventional cine or slide projectors, the use of a supplementary lens with a focal length of 1 m will only allow centering on a fixed and small object field, of the order of 9 × 12 cm in this example. This prevents the transmission of documents of the most common size, or else makes it necessary to use supplementary lenses with very long focal lengths and therefore to make bulky assemblies.

The invention overcomes these disadvantages, making it possible for the television camera to transmit a variable actual object field without changing its equipment. It relates to an optical mixer assembly which is in the form of two cemented semireflective blocks, situated in front of a television camera lens focussed for infinity, and has three orifices for the injection of images, certain of these orifices being adapted to receive the image from a cine or slide projector whose lens is focussed for infinity.

According to the invention, the mixer comprises, in front of at least one of the image injection orifices in the mixer assembly, the portion forming the varying element of a variable-focal-length lens of the zoom type generally comprising a primary lens associated with the varying element, the primary lens having been removed.

According to another feature of the invention, the carying element for the variable-focal-length lens is associated with the optical mixer assembly by means of a total-reflection prism, in such a way that the optical axis of the varying element is parallel to the plane of the corresponding image injection orifice in the optical mixer assembly.

According to a further feature of the invention, the mixer is used in association with an optical system reflecting the object plane of the varying element onto the plane of a support forming a document-supporting panel, with means for lighting this document-supporting panel, with a monitoring receiver for monitoring the images picked up by the television camera, and with a console for operating the projectors, their lighting and the lighting for the document-supporting panel, all these elements being grouped in a zone where they are within reach of a single operator and forming a composing station for visual broadcasts.

In another embodiment of the invention, the mixer is also used in association with a microphone or apparatus for reproducing sound recordings, to form a composing station for audio-visual broadcasts.

The invention will now be described in more detail with reference to a particular embodiment, given by way of example and illustrated in the drawings.

Figure 1:
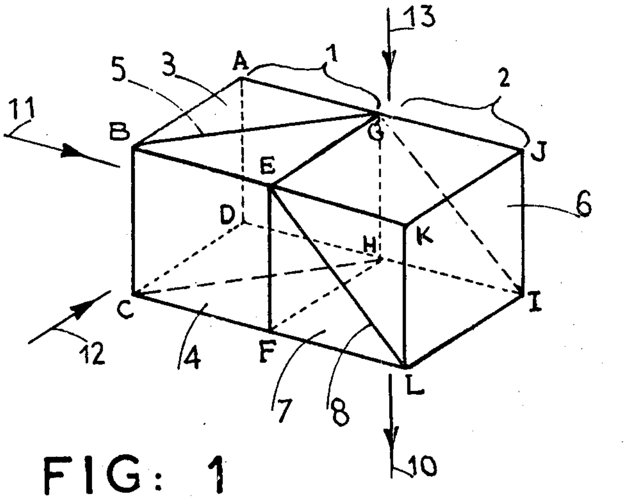
FIGS. 1 and 2 represent the optical mixer assembly, with two semireflective prismatic blocks, used in the mixer, FIG. 1 being a general view of the cemented blocks as used in the apparatus and FIG. 2 an exploded view showing the design of each block and the relative positions of the semireflective prisms.
Figure 2:
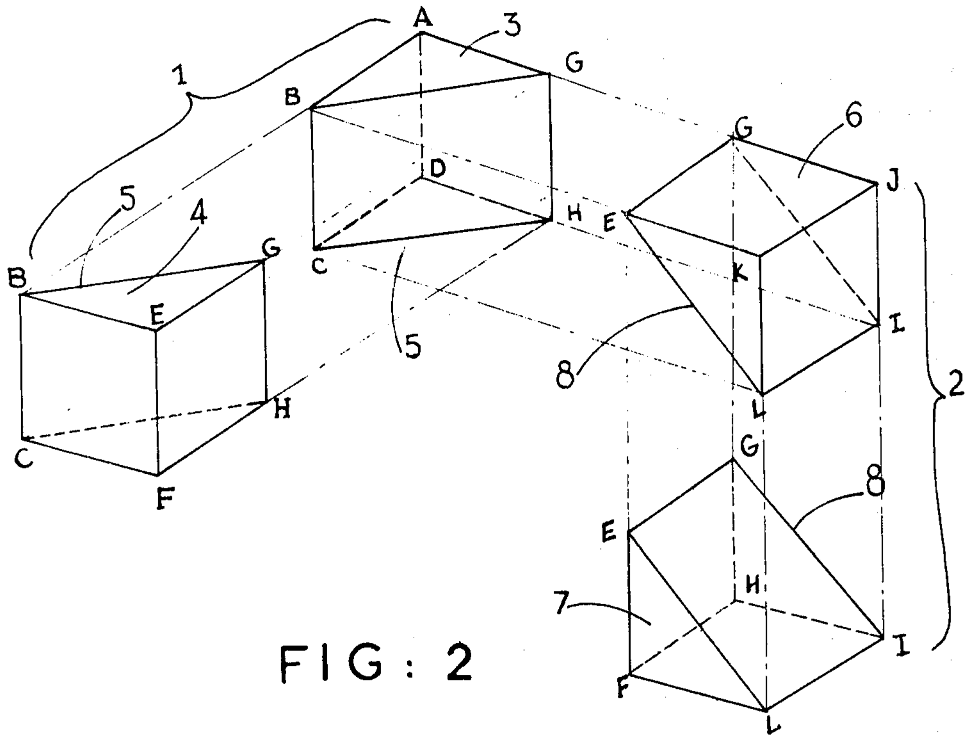

As FIGS. 1 and 2 show, the mixer assembly is formed of two cubical blocks 1, 2 cemented across one of their faces. The cubical block 1 is formed of two right prisms 3, 4 cemented across their hypotenuse faces 5, which form a semireflective surface inside the block 1. Similarly, the block 2 is formed of two right prisms 6, 7 cemented along their common face 8, which forms a semireflective surface. It will be appreciated that a prism assembly of this kind forms a mixer for three light beams. For example, a beam leaving at 10, perpendicular to and coaxial with the face FKIL, might come partly from an incident beam 11 perpendicular to and coaxial with the face ABCD, partly from a second incident beam 12 perpendicular to and coaxial with the face BEFC, and partly from a third incident beam 13 perpendicular to and coaxial with the face EGJK. Obviously, every time a beam passes through or is reflected from a semireflective face, the light will be reduced to some extent by straying or reflection.

Figure 3:
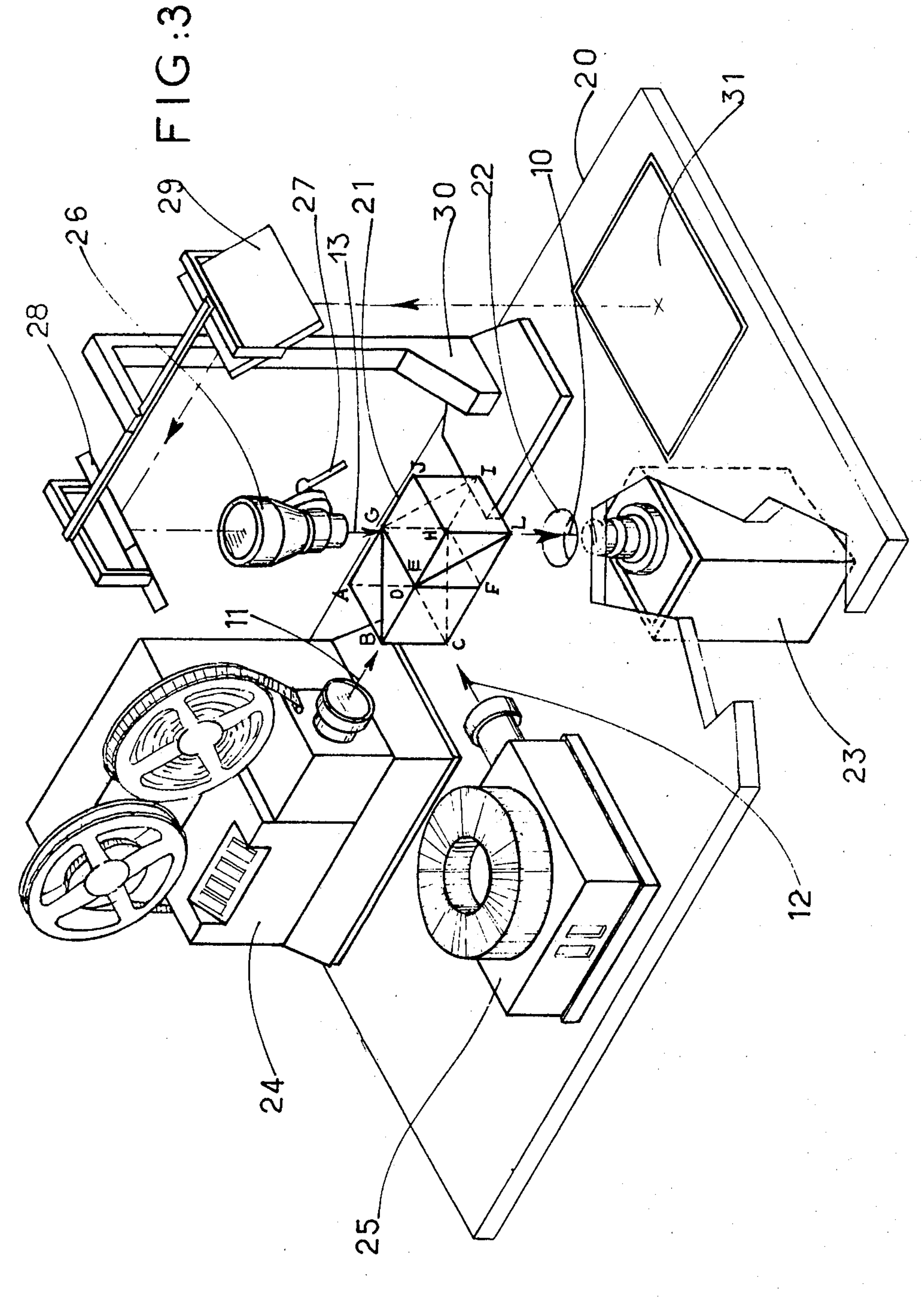
FIG. 3 illustrates the application of the mixer unit to television transmission apparatus.

The whole of the television transmission apparatus shown in FIG. 3 is grouped on a horizontal table 20, above which is held an optical mixer unit 21 with four prisms as described with reference to FIGS. 1 and 2. For clarity's sake, the protective casing for the optical unit and the supports connecting it to the table have been omitted.

The table contains a hole 22, and the optical unit 21 is so situated that the axis of this hole 22 is perpendicular to and coaxial with the face FHIL of the unit 21. Beneath the table is a television camera 23 whose optical axis 10 is coaxial with the hole 22. The table serves to support a cine projector 24, the optical axis of whose lens coincides with the entrance axis 11 of the mixer. Similarly, the optical axis of the slide projector 25, which is placed on top of the table, coincides with the entrance axis 12 of the mixer.

The varying element 26 of a variable-focal-length lens is situated in the extension of the camera axis, above the mixer unit 21. This varying element is formed of fixed lenses and of two sets of movable lenses displaceable simultaneously relative to the fixed lenses by means of an operating lever 27. A support (not shown) holds the varying element 26 above the mixer 21. An assembly of two plane 45° mirrors 28, 29 supported on a gibbet 30 reflects the centre point of a panel 31 on the table 20 along the optical axis of the varying element.

The focal lengths of the various lenses used are, of course, selected according to the sizes used. Let us assume that the television camera is capable of receiving images with a diagonal of 16 mm, with a lens of focal length 100 mm focussed for infinity. If the cine projector used 16 mm film, for which the image diagonal is 12 mm, it will be equipped with a lens of focal length 75 mm focussed for infinity, in proportion to the image diagonals. Similarly, if the projector 25 uses 24 × 36 slides, that is, slides with an image diagonal of 42 mm, it will be equipped with a lens of focal length 250 mm focussed for infinity. Lastly, the characteristics of the varying element 26 will be so selected that the camera lens of focal length 100 mm can be used as the primary lens.

It will be appreciated that, after the varying element has been focussed on the panel by means of its front element, as is usual with such devices, the operating lever 27 can be used to vary the object field covered on the panel, producing a corresponding variation in the magnification. For example, the camera could transmit equally well a complete document of the standard 21 × 27 size or, with very high magnification, a small portion of this document. Also, the varying element could be fitted with any auxiliary focussing device (simple or complex supplementary lenses) in order to modify the position of the object plane and to transmit images of thick actual objects placed on the table.

Figure 4:
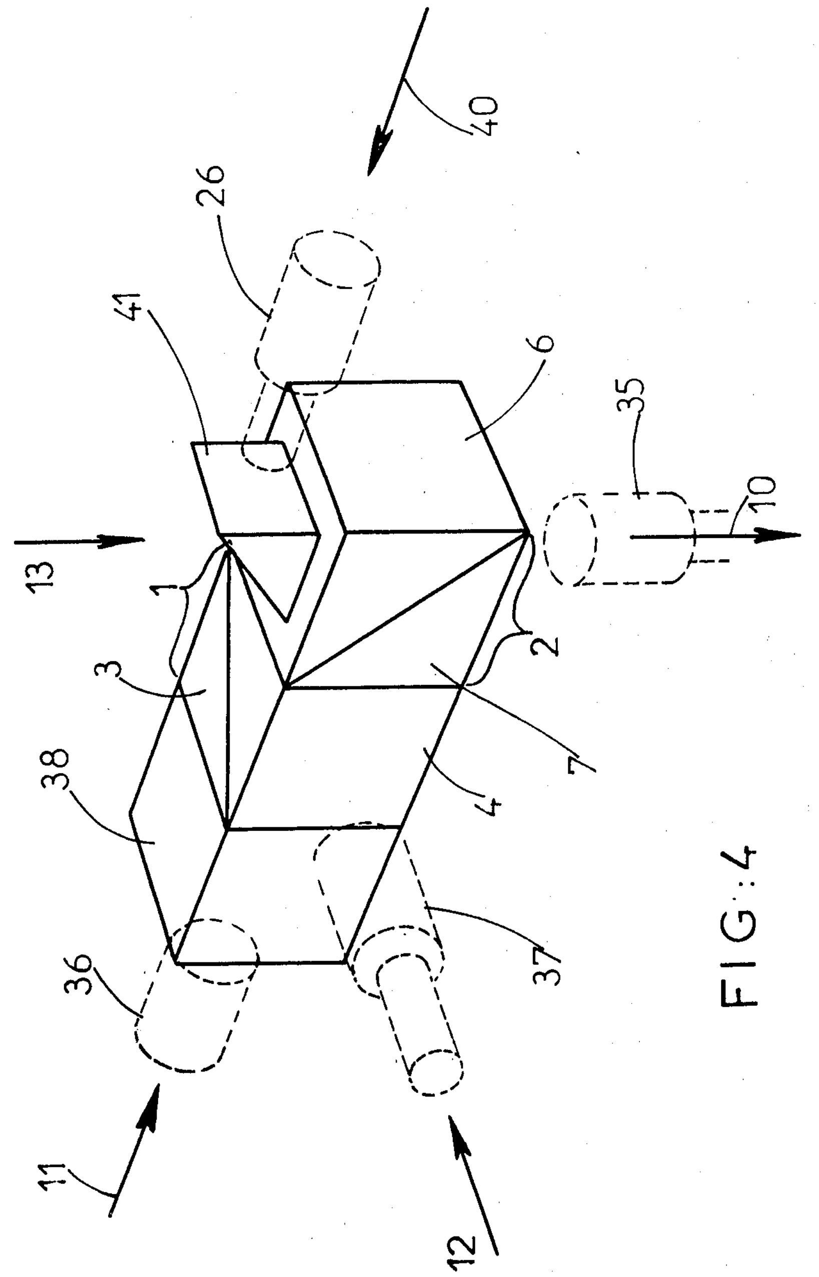
FIG. 4 shows the optical mixer unit with the addition of the entrance prism of the varying element.

In FIG. 4, the optical mixer unit formed of the two cemented cubical blocks 1 and 2 is associated with the lens 35 of a television camera, with the lens 36 of a cine projector and with the lens 37 of a slide projector, respectively situated in the mixer entrance axes 11 and 12 as in FIG. 2. To improve the distribution of the lighting, the lens 36 might be a lens of inverted telephoto formula, bringing the pupil forwards. Also, a glass parallelepiped 38 shortens the optical path and prevents centre-to-edge light losses.

The varying element 26 is situated in an axis 40 parallel to the axis 11 and situated above the mixer. A prism 41 reflects the beam passing through the varying element 26 into the entrance axis 13.

Figure 5:
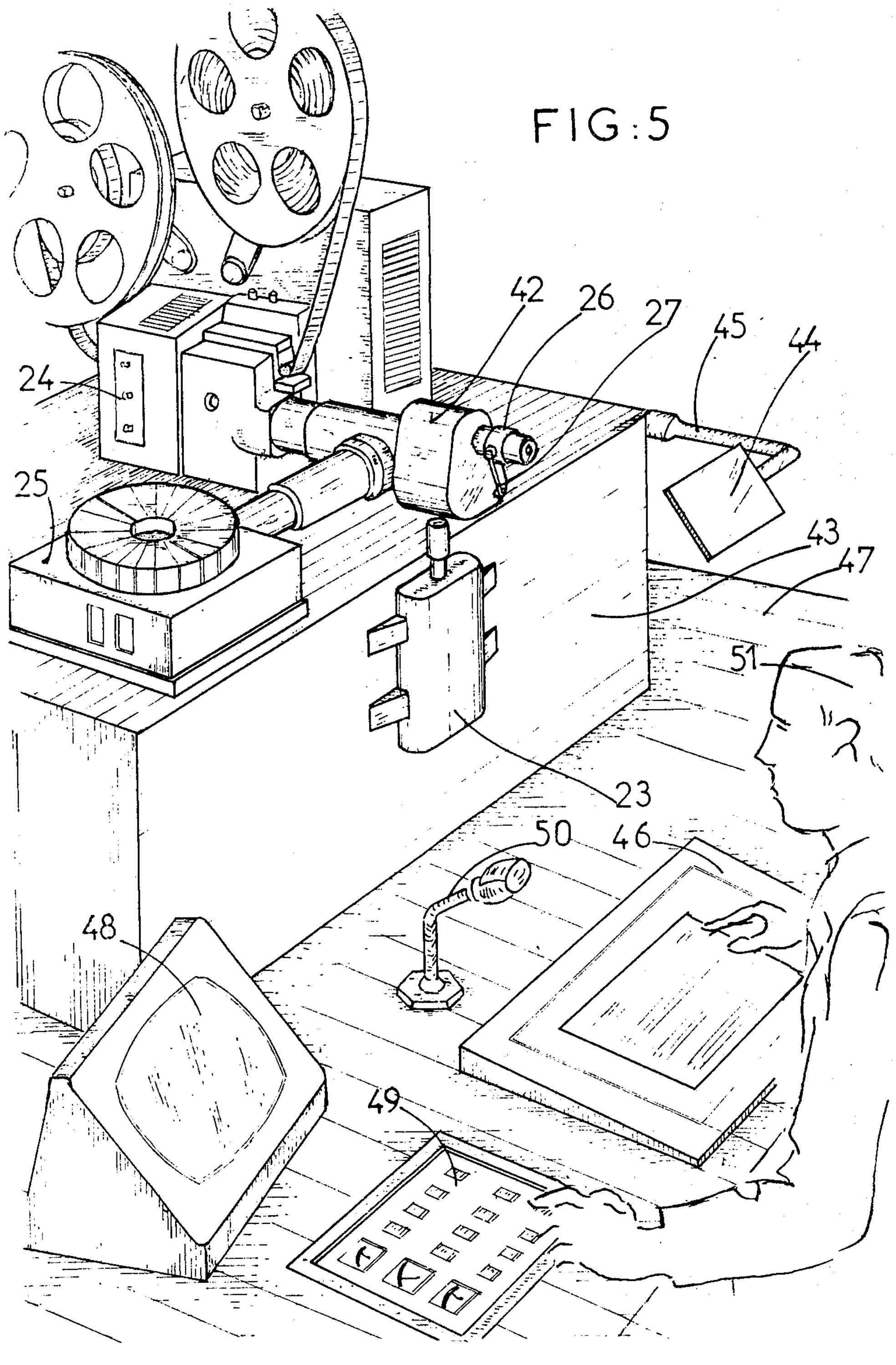
FIG. 5 shows an embodiment of a television teaching station.

The optical mixer unit shown in FIG. 5 is enclosed in a casing 42, which also serves to support the varying element 26 and comprises guide sleeves in which the lenses of the projectors 24, 25 engage. Since these lenses are focussed for infinity, a wide tolerance is possible as regards the distance of the lenses from the mixer unit. The assembly is placed on a supporting table 43, to which the television camera 23 is also fixed. An aluminized mirror 44, connected to the support 43 by an arm 45, reflects along optical axis of the varying element 26 the centre of the panel 46, which is situated on the operator's table 47, and is transilluminated or lit by reflection. On this table 47, also, are a television screen 48, a console 49 and a microphone 50. The console 49 includes all the control means for operating and stopping the projectors, for regulating the intensity of their lighting and for controlling the lighting of the panel 46. The console 49 also includes the sound regulating controls.

All the elements on the table 47 and also the hand lever for operating the varying element 26 are arranged within reach of the operator 51. Alternatively, the varying element 26 might be remote-controlled from a control on the console 49.

The station described enables a teacher or lecturer 51 to present, for example, a film with the addition, separately or superimposed, of still images stored in the projector 25, or of documents which he can arrange on the panel 46 as desired, possibly selecting only details by means of the varying element 26. The monitoring screen 48 shows the image picked up by the camera at all times. The microphone 50 permits a sound commentary.

It should be noted that the resulting arrangement makes it possible to have a station which is much more compact than conventional installations of the field lens and image carrying type. The general arrangement and compactness of the television broadcasting station obtained make it suitable, in particular, for installation against a wall, which is particularly useful, for example, on board a mobile television unit.

Since the optical assembly with semireflective surfaces does not include any moving mirror, it is, in this respect also, more reliable than systems involving image displacement.

It can also be used for lap dissolves, since it permits the use of variable-aperture diaphragms capable even of closing completely. In this case, special condensers are used to give a diffuse light.

Obviously, the invention is not strictly limited to the embodiments described by way of example. It also applies to an assembly in which the various sets of apparatus might be differently positioned relative to one another. Also, the station described might be added to by providing the operator with a tape recorder, a record-player turntable or any other means of reproducing sound recordings.

Lastly, to prevent the noise of the projector motors from carrying, both the projectors 24 and 25 might be isolated behind a sound-insulated partition, and the microphone 50 might be a directional microphone oriented towards the user.

I claim:

1. A mixer for television transmissions, for transmitting selectively simultaneously and separately, a cinematographic image, a photographic image and an image of an actual object under variable magnification comprising an optical mixer assembly producing a mixed image, two cemented semireflective blocks for said assembly, a television camera lens focussed for infinity receiving the mixed image from said mixer, three orifices for said blocks for injection of images receiving the image from a cine and from a slide projector lenses focussed for infinity and, in front of one of said image injection orifices in said mixer assembly blocks, an afocal variable magnification element receiving the image of said actual object.

2. A mixer as claimed in claim 1, including an optical system reflecting the object plane of said varying element onto the plane of a document-supporting panel, means for lighting said document-supporting panel, a monitoring receiver connected to said television camera for monitoring the images picked up by said television camera, and a console connected to and operating said projectors, their lighting and the lighting for said document-supporting panel within reach of a single operator.

* * * * *